(12) United States Patent
Bendix

(10) Patent No.: US 12,253,061 B2
(45) Date of Patent: Mar. 18, 2025

(54) DRIVE SYSTEM FOR INTERIOR WIND TURBINES OF GREAT HEIGHTS AND PERFORMANCE

(71) Applicant: BEVENTUM GMBH, Leipzig (DE)

(72) Inventor: Horst Bendix, Leipzig (DE)

(73) Assignee: BEVENTUM GMBH, Leipzig (DE)

( * ) Notice: Subject to any disclaimer, the term of this patent is extended or adjusted under 35 U.S.C. 154(b) by 0 days.

(21) Appl. No.: 17/757,739

(22) PCT Filed: Nov. 30, 2020

(86) PCT No.: PCT/EP2020/025547
§ 371 (c)(1),
(2) Date: Oct. 25, 2022

(87) PCT Pub. No.: WO2021/121650
PCT Pub. Date: Jun. 24, 2021

(65) Prior Publication Data
US 2023/0044349 A1 Feb. 9, 2023

(30) Foreign Application Priority Data
Dec. 19, 2019 (DE) .................... 10 2019 008 854.9

(51) Int. Cl.
*F03D 15/00* (2016.01)
*F03D 7/02* (2006.01)
(Continued)

(52) U.S. Cl.
CPC .......... *F03D 15/00* (2016.05); *F03D 7/0264* (2013.01); *F03D 13/20* (2016.05); *F03D 17/00* (2016.05)

(58) Field of Classification Search
CPC .......... F03D 13/20; F03D 7/0264; F03D 15/00
See application file for complete search history.

(56) References Cited

U.S. PATENT DOCUMENTS

2011/0018269 A1* 1/2011 Moser .................... F03D 15/00
290/55

FOREIGN PATENT DOCUMENTS

| DE | 102008024829 B4 | 11/2009 |
|----|-----------------|---------|
| DE | 102012009145 A1 | 11/2013 |

(Continued)

OTHER PUBLICATIONS

Translation of WO2017215797 (Year: 2017).*
International Search Report mailed Mar. 5, 2021; translation of International Search Report and Written Opinion.

*Primary Examiner* — Michael R Mansen
*Assistant Examiner* — Mark K Buse
(74) *Attorney, Agent, or Firm* — Heslin Rothenberg Farley & Mesiti P.C.; Victor A. Cardona, Esq.

(57) ABSTRACT

The invention relates to a drive system for interior wind turbines, consisting of a rotatable tower (5) with a rotor mounted at hub height, the generator (16) being located at the foot of the tower (5) on a drive/generator platform (13) and the rotor torque being transferred from above downwards to the generator (16). Particular requirements are placed on such a drive system as the height of the interior wind turbine increases. A steel-wire-cable-reinforced flat belt (18) is used as a transfer element, the ends of which are joined in a particular way to form an endless belt the pretensioning of which is regulated dependent on the properties of the wind, and automatic monitoring is provided which executes an immediate controlled shut-down of the drive system if damage occurs.

1 Claim, 5 Drawing Sheets

(51) Int. Cl.
    *F03D 13/20*     (2016.01)
    *F03D 17/00*     (2016.01)

(56) References Cited

FOREIGN PATENT DOCUMENTS

| | | |
|---|---|---|
| DE | 202016001490 U1 | 6/2016 |
| DE | 202017003631 U1 | 9/2017 |
| DE | 102016206888 A1 | 10/2017 |
| DE | 102016014799 B4 | 4/2018 |
| EP | 2434153 A1 | 3/2012 |
| WO | 2016177883 A1 | 10/2016 |
| WO | 2017215797 A1 | 12/2017 |

\* cited by examiner

DRIVE SYSTEM FOR INTERIOR WIND TURBINES OF GREAT HEIGHTS AND PERFORMANCE

The invention relates to an onshore wind power installation utilizing high altitude wind, having a rotatable tower and transmission of the rotor torque from the hub level to the drive/generator platform disposed in the lower region of the tower.

Wind power installations having stationary towers which are conceived for all wind directions are known from the technical literature. Said known wind power installations presently have hub heights of up to 160 m. Even greater heights lead to dimensions and weights that, for erecting these installations, require lifting gear which is available only to a limited extent. Due to the increasingly greater heights and masses/weights, the enlargement of all functional groups of such a wind power installation leads to high costs when such lifting gear is used during the erection.

Another possibility lies in accommodating the generator at the foot of the wind power installation. This solution is known from publication EP 2 434 153 A1. In the case of the tower disclosed therein, the generator is disposed at the foot. The transmission of the wind force from the top by way of the rotor shaft downward to the generator is performed by a drivetrain which is composed of a plurality of individual drives of in each case two drive pulleys and a drive belt, said individual drives being disposed in succession in the flux of force. The foot of the tower in relation to the foundation is mounted on a rotating unit, as a result of which the entire wind power installation, conjointly with the rotor, can track the wind.

Furthermore known from publication DE 10 2008 024 829 B4 is a wind power installation in which the generator, for the purpose of increasing efficiency, is assigned a flywheel mass for storing excess energy, a coupling installation and an additional motor for driving the generator if required. These functional groups, by virtue of the high total weight thereof, without additional complexity can no longer be accommodated at the top in the nacelle. Therefore, all functional groups downstream of the rotor axle are fastened to a base plate at the foot of the wind power installation. A continuous force transmission installation is provided between the rotor axle disposed at the top and the drive shaft disposed at the bottom. Said force transmission device, for the forces to be transmitted in the range of the customary hub heights and outputs to date can be configured as a traction means mechanism (rope drive, belt drive, or chain drive).

Further wind power installations having rotatable towers known from, inter alia, publications DE 10 2012 009 145 A1, DE 20 2017 003 631 U1, and DE 20 2016 001 490 U1. Such installations are distinguished by higher towers which, conjointly with the rotor, are turned to face the wind.

It is an object of the invention to equip large onshore wind power installations having a rotatable tower with a drive system which, for outputs of >5 MW is disposed between the rotor and the generator, such that the conditions of the wind in the lower tropospheric layer (between 100 and 400 m above the site) are met and the requirements in terms of safety, reliability and efficiency are fulfilled. In particular, the safety in terms of transmitting extreme torques as required by the larger distance between the drive input and the drive output in relation to damage in the flat belt drive, is to be addressed by electronic monitoring and by suitable materials. Such high onshore wind power installations in terms of the fundamental construction thereof are known from publications DE 20 2017 003 631 U1 and DE 10 2016 014 799 B4, without the transmission of force from the rotor disposed at the top, by way of a relatively large distance of almost 200 m and more by means of a drivetrain, downward to the generator being disclosed in detail.

This object is achieved in that a flat belt is used, the latter in the interior thereof being reinforced by high-tensile steel wire ropes running in parallel. These steel wire ropes are combined with/connected to one another at the ends thereof. The flexural carrier material is embodied by cover vulcanization at any arbitrary location of the flat belt, while using mobile devices.

In order for the forces from the rotor shaft to be able to be reliably transmitted to the generator shaft by means of the drive system, apart from the tensile strength, the wrapping angles, coefficients of friction and belt loading force required for the most varied operating conditions are to be adhered to. A reliable belt arrangement has to be guaranteed over the entire length as a result of the large spacing of the belt drive between the upper and the lower belt pulley. For this purpose, low-maintenance guide rollers 100 are provided at specific spacings. In order to ensure the reliability of the transmission of torque between the flat belt and the belt pulleys over the entire length between both belt pulleys, the flat belt as well as the surfaces of the belt pulleys are treated by method procedures with a long-term effect in order to for the coefficient of friction $\mu$ to be guaranteed.

Tearing of the flat belt during operation would cause comparatively long downtimes. Provided therefore is an automatic monitoring installation 110 (FIG. 4) which permanently monitors the integrity of the flat belt and already identifies initial damage to the individual wires of a wire rope in the flat belt, and causes the drive system to be shut down.

A high degree of efficiency of the entire drive system is pursued. This is achieved by using the flat belt and low-maintenance functional groups. A high degree of efficiency of the drive system is also facilitated in that the pre-tensioning of the flat belt drive at all times remains adjusted as required for a reliable operation. To this end, an automatic measurement, open-loop control and closed-loop control installation which reliably adapts and adjusts the pre-tension to the respective wind conditions is provided. This installation is functionally connected to a drive and generator platform that is composed of platform which is mounted in an articulated manner and on which the generator is disposed. A tensioning weight, which by means of a spindle drive is able to be displaced in relation to the longitudinal axis of the joint and thus causes a change in the tensioning force of the belt, is situated below the platform. When two or more generators are used, this pre-tensioning installation is provided for each generator.

Further details and advantages of the subject matter of the invention are derived from the description hereunder and the associated drawings in which a preferred exemplary embodiment for two onshore wind power installations that are of different constructions and utilize high altitude wind is illustrated.

Figure 1:
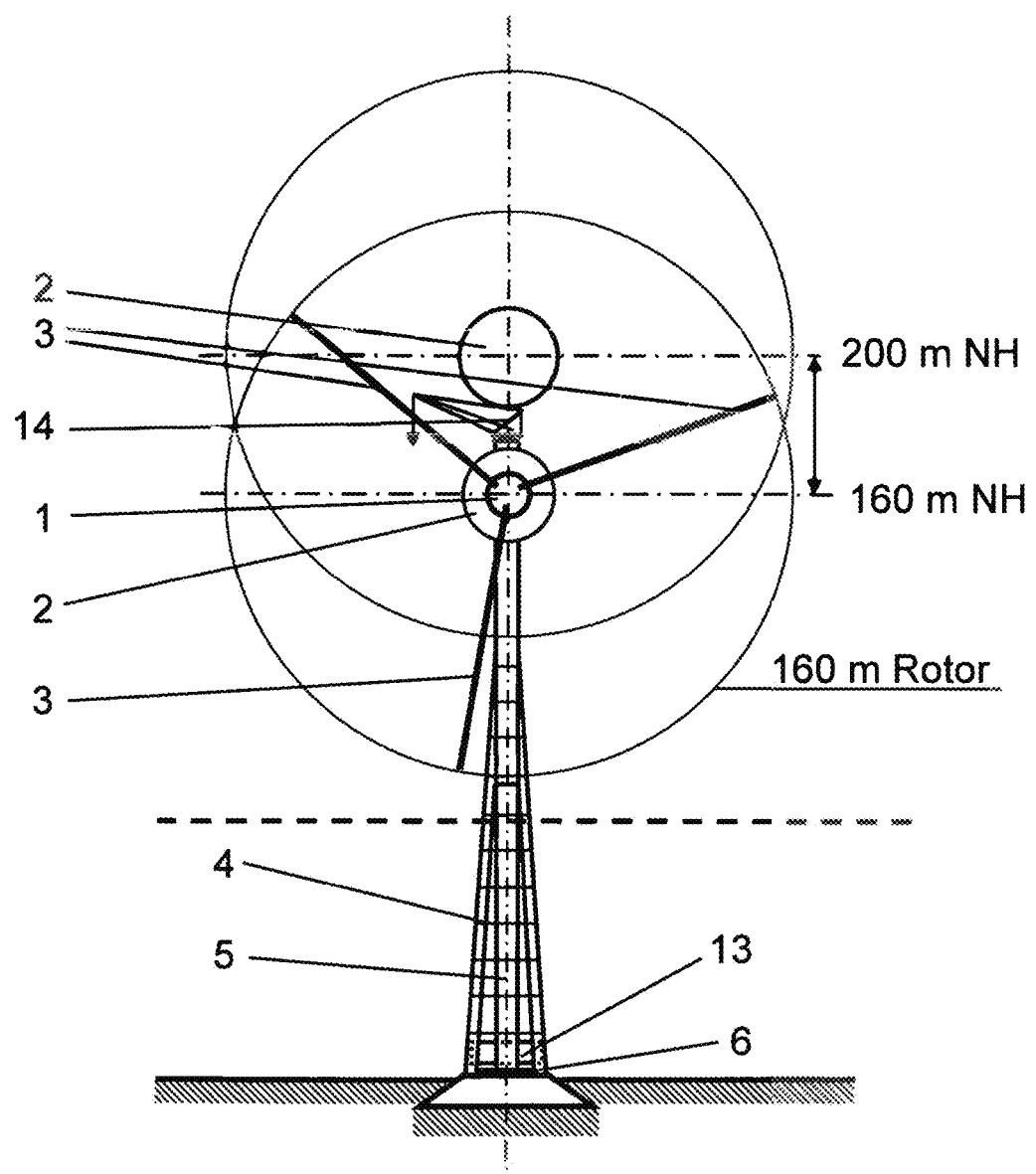
FIG. 1 shows an onshore wind power installation which is suitable for utilizing the wind in tropospheric layers, in the embodiment having a rotatable tower and an expanded tower cross section.

The onshore wind power installation as per FIG. 1 is conceived for utilizing high altitude wind. Said onshore wind power installation in principle is composed of a rotatable tower 5 having an expanded tower cross section 4, the rotor 3 with the rotor hub and the rotor shaft 1, as well as the drive and generator platform 13. A wind power installation of this configuration is known from publication DE 20 2017 003 631 U1. The use of large tubes finally rolled (to up to 3 m in diameter) for the tower 5 in a dual or multiple arrangement in the direction of the primary axis of the tower, and having a downward increase in terms of expansion in the direction of higher load, installed on a rotary connection 6 known and proven in the sector of large excavators, in association with a furthermore increased hub height (NH) in the range from 160 m (lower dashed line) to 200 m (upper dashed line), overall permits a more favorable dead weight and lower costs, despite a higher input of energy in comparison to the conventional construction of the tower 5 having a flexurally stressed cross section.

The onshore wind power installation having the rotatable tower 5 and the expanded tower cross section 4, by way of the primary axis of the tower enables the use of the new drive system for transmitting the rotor torque to the drive/generator platform 13 in the rotatable tower foot. The upper limit of the Prandtl layer is plotted in the drawing, denoted by the reference sign 15. An onboard hoist 14 as an auxiliary means for carrying out the vertical rotor blade assembly, service work and repair work is disposed on the tower 5.

Figure 2:
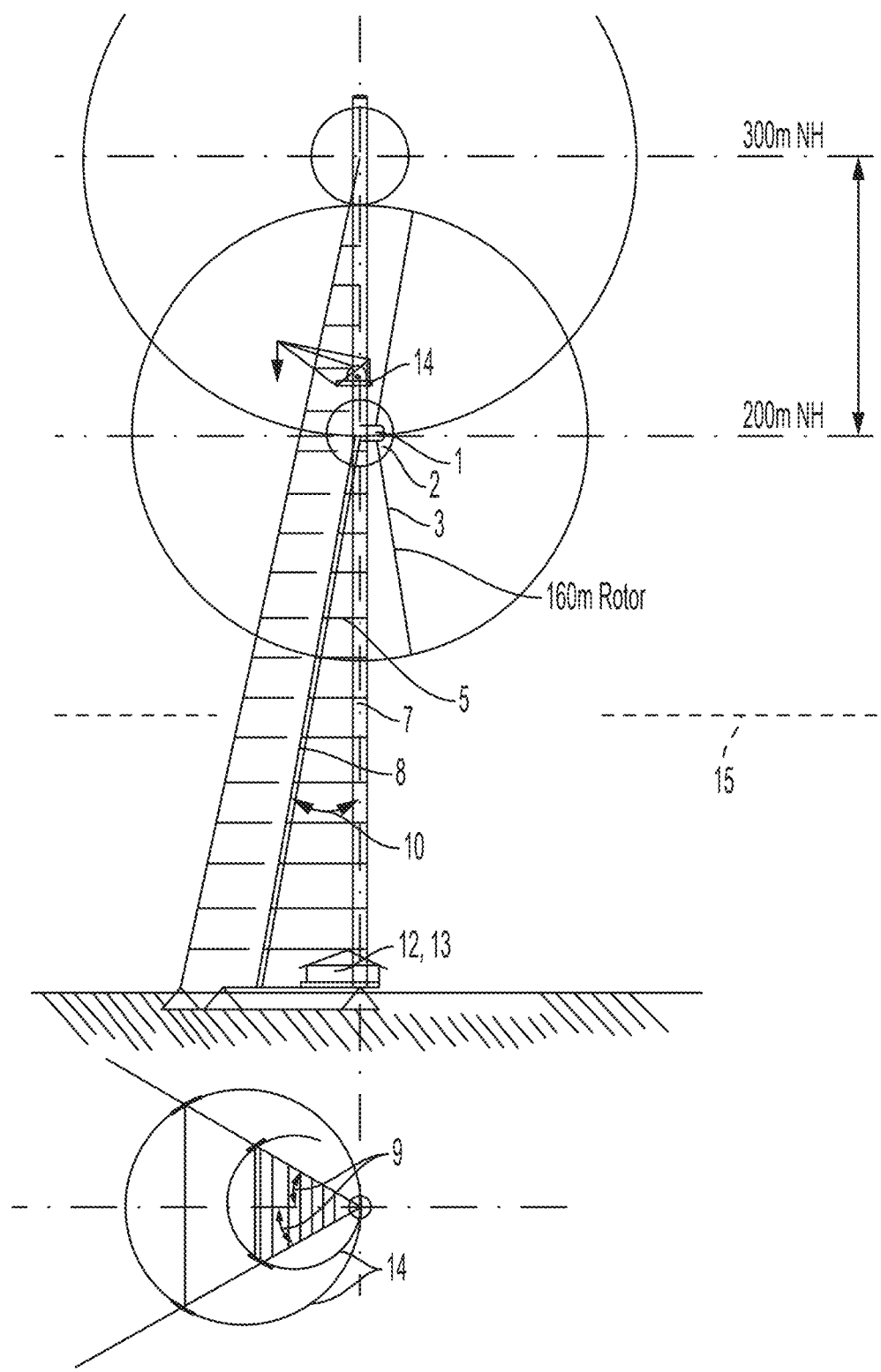
FIG. 2 shows an onshore wind power installation which is suitable for utilizing the wind in tropospheric layers, in the embodiment having a rotatable tower as the vertical column, and at least two counter-bearing pressure columns.

An onshore wind power installation illustrated as per FIG. 2 is known as a "Turning Tower" from publication DE 10 2016 014 799 B4. The upper image shows the installation in a lateral view; the plan view is reproduced in the lower image. The onshore wind power installation is composed of a rotatable tower 5 having a vertical column 7, and having at least two counter-bearing, horizontally and vertically expanded pressure columns 8. The finally rolled large tubes in the manufactured length for the columns 7, 8, and finally rolled or edge-bent profiles are joined to form tower sections. These profiles are erected and joined vertically, section-on-section according to new technological methods, without the use of large lifting gear, or erected as a completely equipped tower 5 assembled horizontally on the ground.

The horizontal expansion angle 9 and the vertical expansion angle 10 are illustrated in the drawing. The machine room 12 as well as the drive/generator platform 13 are situated on a support structure at the foot of the wind power installation. In the case of the smaller embodiment of the tower construction, the hub height (NH) is 200 m (lower chain-dotted line), whereas the hub height (NH) of the larger embodiment of the tower construction is 300 m (upper chain-dotted line). In this way, the higher wind speeds arising in this region are utilized.

The turning circle 11 for the structural stability of the onshore wind power installation is shown in the plan view as per FIG. 2.

Figure 3:
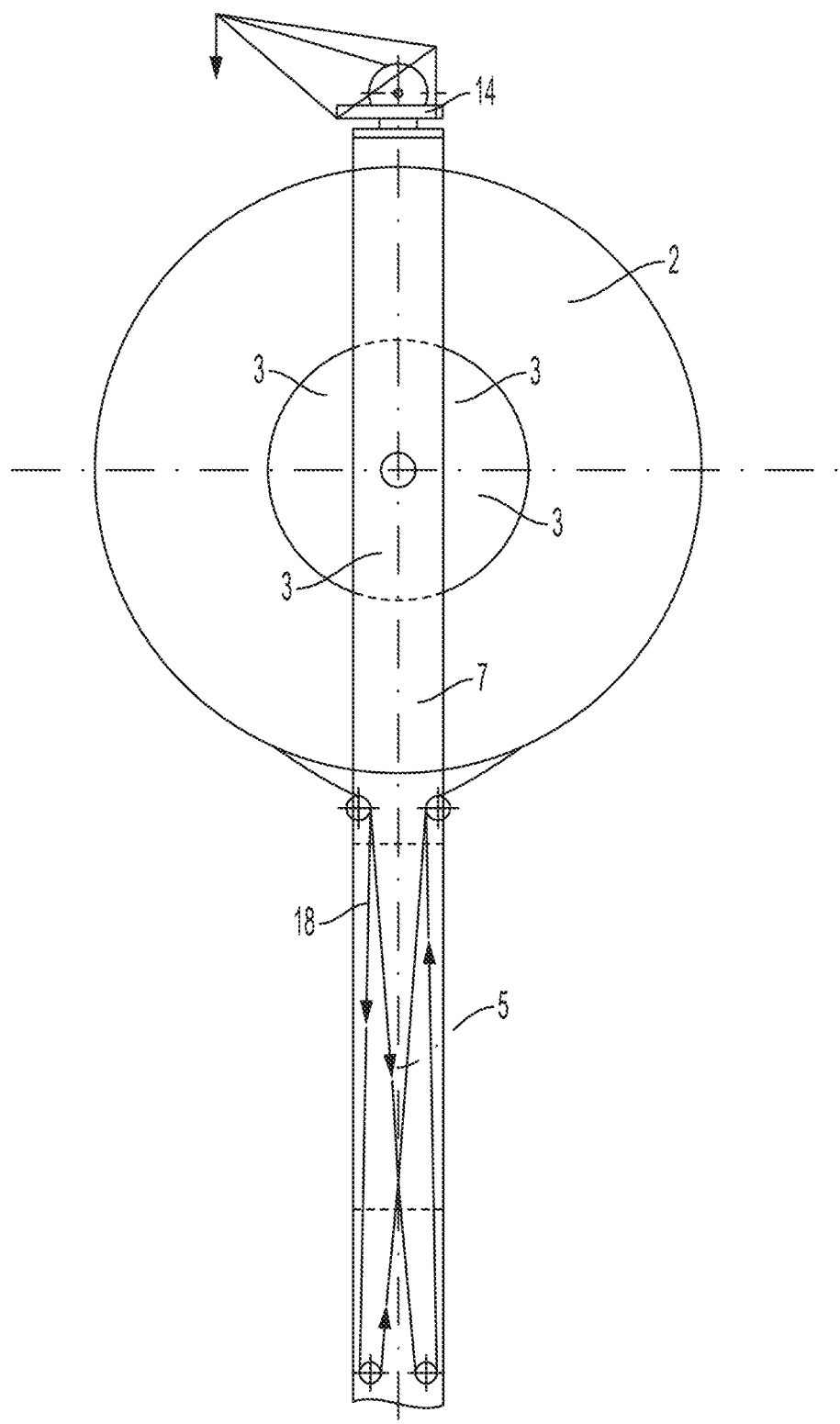
FIG. 3 shows the upper region of the drive system for an onshore wind power installation as per FIG. 1 or 2.
Figure 4:
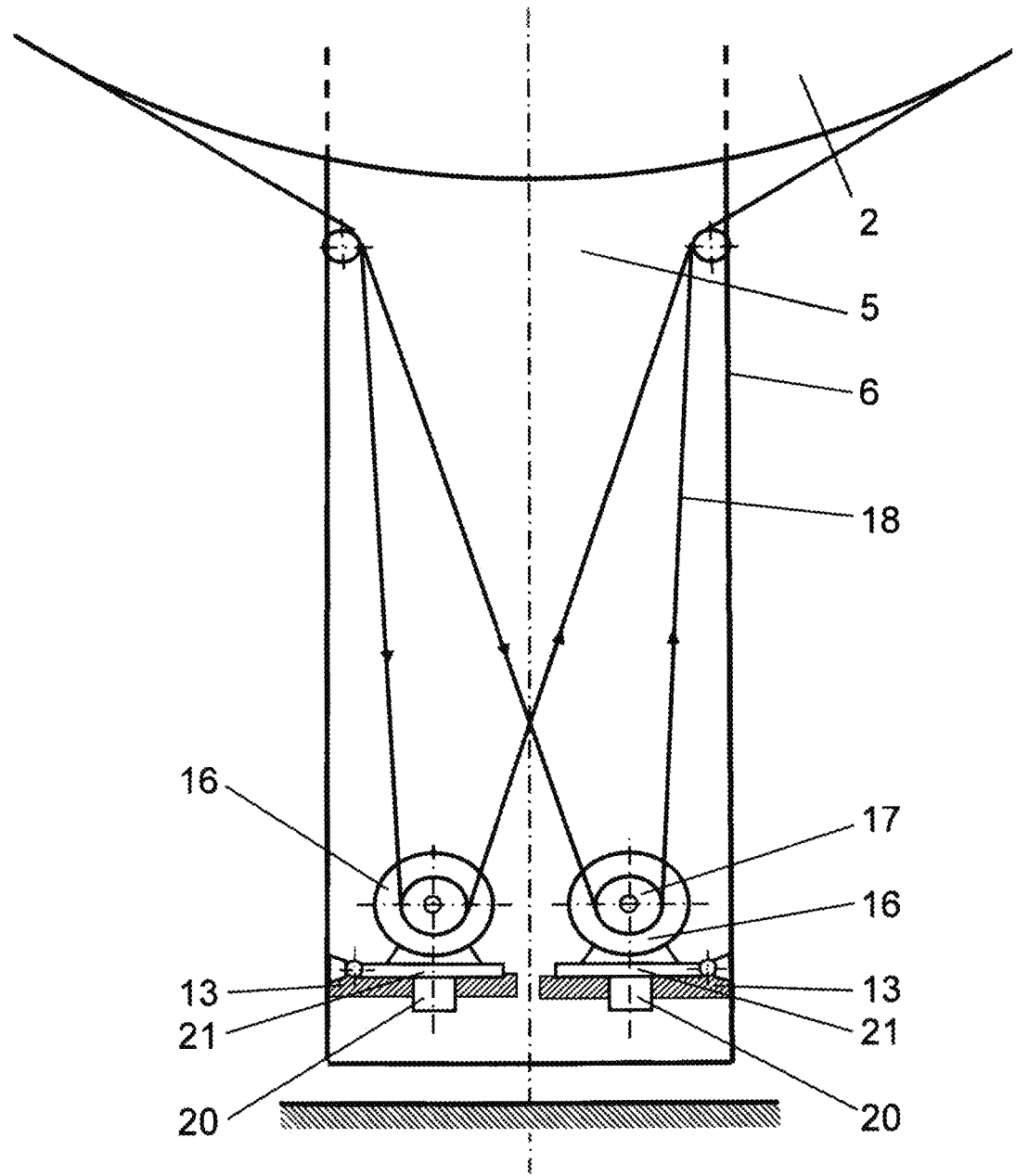
FIG. 4 shows the lower region of the drive system for an onshore wind power installation as per FIGS. 1 or 2.
Figure 5:
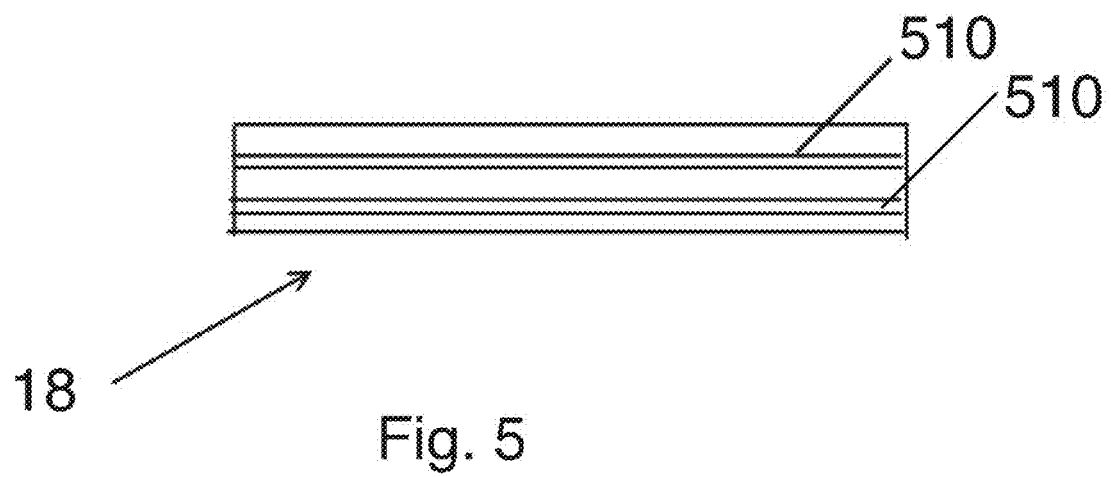
FIG. 5 shows a side cross-sectional view of a flat belt internally reinforced by a plurality of high-tensile steel wire ropes.

The drive system for transmitting the rotor torque from the height of the rotor hub 1, including the gearing and/or drivetrain bifurcation for converting the torque so as to be adapted to the rotating speed of the generator 16 in the rotatable towers 5 of the two onshore wind power installations is illustrated in the drawings as per FIG. 3 (upper region) and FIG. 4 (lower region). The force transmission element between the two belt pulleys 2 and 17 is a flat belt 18. The latter is internally reinforced by a plurality of high-tensile steel wire ropes 510 (FIG. 5) that are disposed so as to be mutually parallel and are disposed in the traction layer between the running layer and the cover layer. Using this steel-wire-rope-reinforced, loop-forming flat belt 18, an intentional gearing ratio is integrated as a result of the dissimilar diameters of the upper and the lower belt pulley 2 and 17, respectively.

The drawings as per FIG. 3 and FIG. 4 show the fundamental construction of a drive with a bifurcated drivetrain in the rotatable tower 5, having a bifurcation to two generators 16. Two flat belts 18 from the upper large belt pulley 2, by way of guide rollers that are assembled in parallel at all times, are guided downward through the tower 5 to two belt pulleys 17. Each of the two associated generators 16 is on the drive/generator platform 13 and, as a result of the dead mass thereof, generates the majority of the belt pre-tensioning.

In addition, the linkage 21 having the pre-tensioning weight 20 has the possibility of closed-loop controlling the pre-tensioning as a function of the wind speed. A drivetrain bifurcation having two generators 16 is illustrated in FIG. 4. Such an embodiment is not mandatory, however. The transmission of force from the top to the bottom can also take place by one flat belt 18 to one generator 16. As a result of the primary axis of the rotatable tower—proceeding from the rotatability on the ground by way of the drive in the rotatable tower foot and the steel-wire-rope-supported, loop-forming flat belt drive with the bifurcated drivetrain, including the gearing ratio between the rotor shaft 1 and the shaft of the generator 16—a reliable permanent operation is guaranteed at any arbitrary hub height.

The flat belt 18 is routed downward in the interior of the vertical column and in this way is protected in relation to external influences (influences of rain or dust, etc.) and in relation to damage to the drive system.

LIST OF REFERENCE SIGNS

1 Rotor hub with rotor shaft
2 Belt pulley
3 Rotor
4 Expanded tower cross section
5 Rotatable tower
6 Rotary connection
7 Vertical column
8 Pressure column
9 Horizontal expansion angle
10 Vertical expansion angle
11 Turning circle
12 Machine room/operations
13 Drive/generator platform
14 Onboard hoist
15 Upper limit of the Prandtl layer
16 Generator
17 Belt pulley
18 Flat belt
20 Pre-tensioning weight
21 Linkage
NH Hub height

The invention claimed is:

1. A drive system for an onshore wind power installation, composed of a rotatable tower having a rotor mounted at a hub height (NH) and a drive and generator platform disposed at a foot of the tower, wherein a flat belt is provided for transmitting a rotor torque, wherein
- as a transmission element in one or multiple parts, the flat belt connected by loops, and by way of a large belt pulley at the hub height (NH), and by way of guide rollers on the path to a small belt pulley on the drive/generator platform, transmits and feeds the rotor torque singularly or while bifurcating through a drive-train;
- the flat belt, by way of incorporated steel wire ropes, comprises a high-tensile flat belt in double the length of the spacing of the upper belt pulley from the lower belt pulley;
- the high-tensile flat belt by way of wire rope combinations and connections, while interacting with a material of a vulcanization, is suitable for forming a loop at any arbitrary location in the flat belt as well as at every location in the belt arrangement in the rotatable tower;
- in addition to a permanent pre-tensioning of the flat belt from a floating dead weight of the drive/generator platform, an optimal position of pre-tensioning weights by means of a condition monitoring system (CMS) is provided for fine adjustment to currently prevailing wind conditions; and
- an automatic belt monitor for permanently checking the integrity of the flat belts, said automatic belt monitor performing the immediate controlled shut-down of the drive system in the event of damage.

* * * * *